(12) United States Patent
Okamoto et al.

(10) Patent No.: US 9,085,095 B2
(45) Date of Patent: Jul. 21, 2015

(54) THERMOPLASTIC RESIN COMPOSITION FOR BLOW MOLDING AND BLOW MOLDED ARTICLES THEREOF

(75) Inventors: Kazuhiro Okamoto, Tokyo (JP); Junichiro Nitta, Tokyo (JP); Masahiko Nagasaka, Tokyo (JP)

(73) Assignee: TECHNO POLYMER CO., LTD., Tokyo (JP)

( * ) Notice: Subject to any disclaimer, the term of this patent is extended or adjusted under 35 U.S.C. 154(b) by 596 days.

(21) Appl. No.: 12/594,860

(22) PCT Filed: May 23, 2008

(86) PCT No.: PCT/JP2008/001292
§ 371 (c)(1),
(2), (4) Date: Oct. 6, 2009

(87) PCT Pub. No.: WO2008/146478
PCT Pub. Date: Dec. 4, 2008

(65) Prior Publication Data
US 2010/0119750 A1   May 13, 2010

(30) Foreign Application Priority Data
May 30, 2007 (JP) ................. 2007-143081

(51) Int. Cl.
*C08F 8/00* (2006.01)
*B29C 49/00* (2006.01)
*C08K 5/00* (2006.01)
(Continued)

(52) U.S. Cl.
CPC ........... *B29C 49/0005* (2013.01); *C08K 5/0075* (2013.01); *B29C 49/04* (2013.01);
(Continued)

(58) Field of Classification Search
CPC .. B29C 49/0005; B29C 49/04; B29C 51/002; B29C 51/10; B29C 2049/4605; B29C 2049/4608; B29C 2049/4626; Y10T 428/1386; C08F 266/04; C08F 279/02; C08L 51/003
USPC ........... 525/191, 103, 64; 264/323; 428/35.7, 428/34.1
See application file for complete search history.

(56) References Cited

U.S. PATENT DOCUMENTS

| 2006/0111514 A1* | 5/2006 | Higaki et al. | 525/191 |
| 2006/0155067 A1* | 7/2006 | Motoshige et al. | 525/191 |
| 2008/0081855 A1* | 4/2008 | Mullen | 524/105 |

FOREIGN PATENT DOCUMENTS

| JP | 5-124091 | 5/1993 |
| JP | 7-32454 | 2/1995 |

(Continued)

OTHER PUBLICATIONS

International Search Report for International Application No. PCT/JP2008/001292 dated Jun. 6, 2008.

*Primary Examiner* — Ellen S Wood
(74) *Attorney, Agent, or Firm* — Kratz, Quintos & Hanson, LLP

(57) ABSTRACT

A thermoplastic resin composition for blow molding is disclosed, which comprises a styrene based resin composition (A) containing a graft copolymer (A-1) containing an $\alpha,\beta$-unsaturated glycidyl ester compound, a graft copolymer (A-2) not containing an $\alpha,\beta$-unsaturated glycidyl ester compound and a copolymer (A-3), and an antistatic agent (B). According to the thermoplastic resin composition for blow molding of the present invention, blow molded articles are provided, which are excellent not only in surface property, impact resistance and heat resistance, but also in effects of suppressing adhesion of polished powder generated in a sanding process and dust during storage until the coating process, and further, the thermoplastic resin composition for blow molding which is reduced in adhesion property to a metal and is excellent in resistance to drawdown, and blow molded articles therefrom are provided.

8 Claims, 1 Drawing Sheet

(51) Int. Cl.
*C08F 265/04* (2006.01)
*C08F 279/02* (2006.01)
*C08L 51/00* (2006.01)
*B29C 49/04* (2006.01)
*B29C 51/00* (2006.01)
*B29C 51/10* (2006.01)
*B29C 49/46* (2006.01)

(52) U.S. Cl.
CPC .............. *B29C 51/002* (2013.01); *B29C 51/10* (2013.01); *B29C 2049/4605* (2013.01); *B29C 2049/4608* (2013.01); *B29C 2049/4626* (2013.01); *C08F 265/04* (2013.01); *C08F 279/02* (2013.01); *C08L 51/003* (2013.01); *Y10T 428/1386* (2015.01)

(56) References Cited

FOREIGN PATENT DOCUMENTS

| | | |
|---|---:|---:|
| JP | 8-92456 | 4/1996 |
| JP | 9-118801 | 5/1997 |
| JP | 9-324087 | 12/1997 |
| JP | 10-110075 | 4/1998 |
| JP | 11-60857 | 3/1999 |
| JP | 11-314266 | 11/1999 |
| JP | 2000-186178 | 7/2000 |
| JP | 2001-214026 | 8/2001 |
| JP | 2001-279049 | 10/2001 |
| JP | 2002-322329 | 11/2002 |

\* cited by examiner (a)
Weight falling position
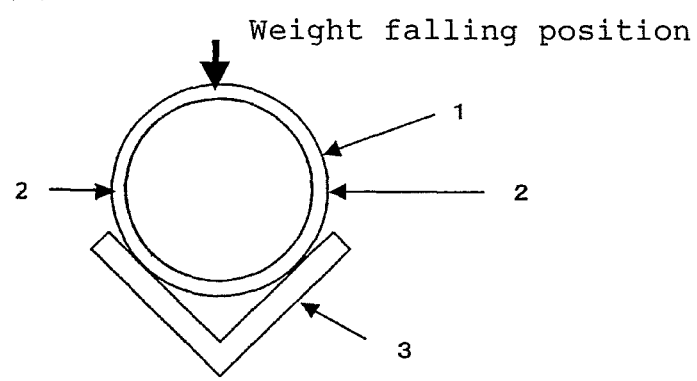
(b)
Weight falling position
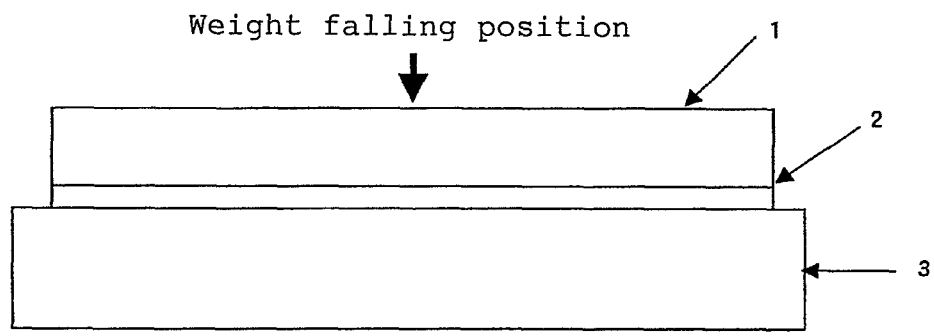

THERMOPLASTIC RESIN COMPOSITION FOR BLOW MOLDING AND BLOW MOLDED ARTICLES THEREOF

TECHNICAL FIELD

The present invention relates to a thermoplastic resin composition for blow molding excellent in surface property of a molded article thereof, impact resistance, and heat resistance as well as blow moldability such as resistance to drawdown, and a blow molded article obtained by molding the composition. Further, the present invention relates to a thermoplastic resin composition for blow molding which gives a molded article having a surface to which a polished powder of the molded article generated in a sanding process before coating scarcely adheres and also gives a molded article having a surface to which dust scarcely adheres during storage until the coating process and therefore which makes it easy to carry out a work for removing them before coating, and a blow molded article obtained by molding the composition. Furthermore, the present invention relates to a thermoplastic resin composition for blow molding with low adhesion of the resin to a metal.

BACKGROUND ART

Conventionally, thermoplastic resins such as high density polyethylene, low density polyethylene, linear low density polyethylene and polyvinyl chloride have been employed as a material for blow molding in order to produce bottles or the like. Recently, so-called engineering plastics excellent in thermal properties and mechanical properties have been employed for electric and electronic appliances such as an air duct and lighting equipments, automotive parts such as an air spoiler and a console, furniture parts such as a top panel of a desk, and the like (e.g. Patent Document 1).

The above-mentioned blow molded articles of the engineering plastics and the like have a large number of small recessed parts (hereinafter, referred to as recesses) on the surfaces formed during the blow molding and, for example, an air spoiler for which a smooth coating surface is required, secondary processability by sanding has often been needed before coating. In this connection, it is supposed that the above-mentioned recesses are generated in a manner that a gas which is not completely extracted from the parting face of a mold and left between a parison made of a melted engineering plastic and the mold surface during the blow molding is left in form of a large number of small spheres on the molded article surface and thereafter, the engineering plastic is cooled and solidified.

On the other hand, ABS resin compositions for blow molding having resistance to formation of recesses on the surface of a blow molded article and excellent in impact resistance, heat resistance, rigidity, and blow moldability by blending specified amounts of specified graft copolymers and copolymers have been proposed (e.g. Patent Document 2).

However, even if products such as an air spoiler for which a smooth coating surface is required are produced using any of the above-mentioned materials for blow molding, polished powder of the molded article generated in a sanding process before coating adheres to the molded article surfaces or, for example, airborne dust adheres to the product surfaces during storage until the coating process, so that a work for removing them has to be carried out before the coating and the productivity may be lowered in some cases.

Further, the above-mentioned materials for blow molding all have high adhesion of the resin to a metal and therefore, at the time of forming a parison by extruding melted resin out of a die at the time of blow molding, the melted resin adheres to the metal surface of the die or the like to make smooth molding impossible or the adhered resin causes decomposition or thermal deterioration and becomes foreign matters to thereby blemish the surface appearance of the blow molded articles in some cases.

Furthermore, since a resin tends to adhere to the metal surface such as a screw surface, a barrel inner wall, or the like of a blow molding apparatus, an extruder, or the like, it sometimes becomes impossible to efficiently carry out purging of the resin or the replacement work for the resin.

Patent Document 1: Japanese Patent Application Laid-Open (JP-A) No. 7-32454

Patent Document 2: JP-A No. 2001-214026

DISCLOSURE OF THE INVENTION

Problems to be Solved by the Invention

The inventors of the present invention have made various investigations to solve the above-mentioned problems and have found that addition of a specified amount of a specified antistatic agent to a resin composition containing specified components and also addition of a specified antistatic agent and specified substances give the resin composition good surface property of a blow molded article of the composition, impact resistance, heat resistance, and blow moldability such as resistance to drawdown or the like. Further, the inventors of the present invention have also found that since a polished powder of a molded article generated in the sanding process before coating hardly adheres to the molded article surface and dust hardly adheres to the molded article surface during storage until the coating process, the work for removing them before coating can be lessened. Moreover, the inventors of the present invention have found that since the adhesion of the resin to a metal is also low, even if the melted resin is extruded out of a die at the time of blow molding, the melted resin hardly adheres to the metal surface of the die or the like and thus molding is carried out smoothly. Furthermore, the inventors of the present invention have also found that since the resin hardly adheres to the metal surfaces such as screw surface, barrel inner wall, or the like of a blow molding apparatus and the resin is easily peeled off from the above-mentioned metal surfaces, the workability of replacing the resin becomes excellent. These findings have now led to the completion of the thermoplastic resin composition for blow molding of the present invention and a blow molded article obtained by molding the composition.

Means for Solving the Problems

To attain the above-mentioned objects, the present invention possesses the following characteristics 1 to 4.

1. A thermoplastic resin composition for blow molding comprises 100 parts by weight of a styrene based resin composition (A) containing 0.1 to 30% by weight of the following graft copolymer (A-1), 1 to 54.9% by weight of the following graft copolymer (A-2), and 45 to 95% by weight of the following copolymer (A-3) (the total of the graft copolymer (A-1), the graft copolymer (A-2), and the copolymer (A-3) being 100% by weight) and 0.1 to 10 parts by weight of an antistatic agent (B) with a melting point of 170° C. or lower:

(A-1): a graft copolymer obtained by polymerizing 95 to 5 parts by weight of a monomer mixture containing 0.1 to 30.2% by weight of an $\alpha,\beta$-unsaturated glycidyl ester compound, 9.9 to 40% by weight of a vinyl cyanide compound, and 59.9 to 90% by weight of an aromatic vinyl compound (the total of the monomers being 100% by weight), in the presence of 5 to 95 parts by weight of a rubber type polymer (the total of the rubber type polymer and the monomer mixture being 100 parts by weight), (A-2): a graft copolymer obtained by polymerizing 95 to 5 parts by weight of a monomer mixture containing 10 to 40% by weight of a vinyl cyanide compound and 60 to 90% by weight of an aromatic vinyl compound (the total of the monomers being 100% by weight), in the presence of 5 to 95 parts by weight of a rubber type polymer (the total of the rubber type polymer and the monomer mixture being 100 parts by weight), and (A-3): a copolymer obtained by polymerizing a monomer mixture containing 5 to 40% by weight of a vinyl cyanide compound, 45 to 95% by weight of an aromatic vinyl compound, and 0 to 50% by weight of other vinyl compounds copolymerizable with these monomers (the total of the monomers being 100% by weight).

2. The thermoplastic resin composition for blow molding as described in the above-mentioned invention 1, wherein the melting point of the antistatic agent (B) is 40 to 170° C.

3. The thermoplastic resin composition for blow molding as described in the above-mentioned invention 1 or 2, wherein 0.01 to 10 parts by weight of at least one compound (C) selected from the group consisting of hydroxides and carbonates of alkali metals, hydroxides, carbonates, and oxides of alkaline earth metals, 0.01 to 5 parts by weight of talc (D), and 0.01 to 5 parts by weight of a polyolefin based wax (E) are further blended with 100 parts by weight of the styrene based resin composition (A).

4. A blow molded article obtained by blow molding the thermoplastic resin composition for blow molding as described in any one of the above-mentioned inventions 1 to 3.

Effects of the Invention

The thermoplastic resin composition for blow molding of the present invention is excellent in surface property of a blow molded article, impact resistance, heat resistance, and blow moldability such as resistance to drawdown. Further, by blending the specified antistatic agent in the specified amounts, polished powder generated in a sanding process before coating is difficult to adhere to the surface of the molded article, and dust is also difficult to adhere to the surface of the molded article during storage until the coating process. Accordingly, the work for removing them before coating is lessened and productivity of the blow molded article can be remarkably improved.

Further, blending at least one compound (C) selected from the group consisting of hydroxides and carbonates of alkali metals, hydroxides, carbonates, and oxides of alkaline earth metals, talc (D), and a polyolefin based wax (E) to the above-mentioned thermoplastic resin composition for blow molding lowers the adhesion of the resin composition to a metal. Accordingly, since the resin composition hardly adheres to the metal surface of a die or the like at the time of blow molding, the above-mentioned resin composition hardly causes thermal deterioration and decomposition, and therefore, there is less possibility of damaging surface appearance of the blow molded article. Further, since the resin composition hardly adheres to the metal surfaces of the screw surface and the barrel inner wall of a blow molding apparatus, the workability of purging and replacing the resin becomes excellent and the productivity can remarkably be improved.

Moreover, fine irregularities are formed on the parison surface at the time of blow molding, gas purging between the parison surface and the mold surface occurs well. Furthermore, since formation of recesses larger than the fine irregularities can be suppressed, the work needed for the secondary processability such as sanding to obtain a smooth coating surface can be lessened. Consequently, the present invention is remarkably useful as a thermoplastic resin composition for blow molding for obtaining a blow molded article such as an air spoiler or the like which is required to have beautiful surface appearance and as a blow molded article obtained by molding the composition.

BRIEF DESCRIPTION OF DRAWINGS

FIG. 1(a) is a front view showing the setting method of a cylindrical blow molded article in a low temperature falling weight test and FIG. 1(b) is a side view of the same.

EXPLANATION OF THE SYMBOLS

1. A cylindrical blow molded article
2. A parting line
3. A tool for fixing a molded article

BEST MODE FOR CARRYING OUT THE INVENTION

Hereinafter, the present invention will be described in more detail. In this specification, "(co)polymerization" means homopolymerization and copolymerization, "(meth)acryl" means acryl and/or methacryl, and "(meth)acrylate" means acrylate and/or methacrylate.

The thermoplastic resin composition for blow molding of the present invention is obtained by blending the specified amount of an antistatic agent (B) with a styrene based resin composition (A) containing the specified graft copolymers (A-1) and (A-2), and a copolymer (A-3) in the specified amounts. Further, if necessary, the specified amounts of an alkali metal compound or the like (C), talc (D), and a polyolefin based wax (E) are blended.

Styrene Based Resin Composition (A)

The styrene based resin composition comprises the following graft copolymers (A-1) and (A-2), and a copolymer (A-3).

A Graft Copolymer (A-1): (Hereinafter, Also Referred to as "Component (A-1)")

The component (A-1) to be used in the present invention is a graft copolymer obtained by polymerizing, in the presence of 5 to 95 parts (parts by weight, unless otherwise specified, the same applies hereinafter), preferably 10 to 90 parts of a rubber type polymer, 5 to 95 parts, preferably 10 to 90 parts of a monomer mixture containing 0.1 to 30.2% (% by weight, unless otherwise specified, the same applies hereinafter), preferably 0.1 to 25% of an α,β-unsaturated glycidyl ester compound, 9.9 to 40%, preferably 9.9 to 35% of a vinyl cyanide compound, and 59.9 to 90%, preferably 64.9 to 90% of an aromatic vinyl compound (the total of the monomers being 100%) in such a manner that the total of the rubber type polymer and the monomer mixture is adjusted to be 100 parts.

In the above-mentioned component (A-1), if the amount of the rubber type polymer is less than 5 parts, the impact resistance is lowered and on the other hand, if it exceeds 95 parts, the heat resistance, blow moldability, and secondary processability such as sanding are lowered. Further, if the amount of the α,β-unsaturated glycidyl ester compound is less than 0.1%, the effect of suppressing formation of recesses and making the surface uniform becomes insufficient and on the other hand, if it exceeds 30.2%, the impact resistance is lowered. Further, if the amount of the vinyl cyanide compound is less than 9.9%, the impact resistance is lowered and on the other hand, if it exceeds 40%, the heat resistance is lowered. Furthermore, if the amount of the aromatic vinyl compound is less than 59.9%, the moldability becomes insufficient and on the other hand, if it exceeds 90%, the impact resistance is lowered.

Examples of the rubber type polymer to be used for the above-mentioned component (A-1) include conjugated diene based rubbers such as polybutadienes, butadiene-styrene copolymers (SBR), butadiene-acrylonitrile copolymers (NBR), butadiene-acrylic acid ester copolymers, or the like; ethylene-α-olefin based rubbers such as ethylene-propylene copolymers (EPR), ethylene-propylene non-conjugated diene copolymers (EPDM), or the like; acrylic rubbers such as polybutyl acrylate, poly-2-ethylhexyl acrylate, or the like; silicone rubbers; and silicone-acryl compounded rubbers. They may be used alone or two or more of them may be used in form of a mixture. Among them, polybutadiene is preferable from the viewpoint of improvement of the impact resistance of the blow molded articles. The weight average particle diameter of the rubber type polymer is preferably 0.05 to 2 μm, more preferably 0.05 to 1.5 μm, and even more preferably 0.15 to 1.2 μm from the viewpoint of improvement of impact resistance.

Examples of the α,β-unsaturated glycidyl ester compound include glycidyl acrylate, glycidyl methacrylate, glycidyl ethacrylate, or the like. They may be used alone or two or more of them may be used in form of a mixture.

Examples of the above-mentioned vinyl cyanide compound include acrylonitrile, methacrylonitrile, or the like and they may be used alone or two or more of them may be used in form of a mixture. Among them, preferable is acrylonitrile.

Examples of the above-mentioned aromatic vinyl compound include styrene, α-methylstyrene, methylstyrene, vinylxylene, monochlorostyrene, dichlorostyrene, monobromostyrene, dibromostyrene, fluorostyrene, p-tert-butylstyrene, ethylstyrene, vinylnaphthalene, or the like and they may be used alone or two or more of them may be used in form of a mixture. Among them, preferable are styrene and α-methylstyrene.

The above-mentioned monomer mixture may contain, if necessary, other copolymerizable vinyl based compounds. Examples of the copolymerizable vinyl based compounds include acrylic acid alkyl esters such as methyl acrylate, ethyl acrylate, propyl acrylate, butyl acrylate, amyl acrylate, hexyl acrylate, octyl acrylate, 2-ethylhexyl acrylate, cyclohexyl acrylate, phenyl acrylate, or the like; methacrylic acid alkyl esters such as methyl methacrylate, ethyl methacrylate, propyl methacrylate, butyl methacrylate, amyl methacrylate, hexyl methacrylate, octyl methacrylate, 2-ethylhexyl methacrylate, cyclohexyl methacrylate, dodecyl methacrylate, octadecyl methacrylate, phenyl methacrylate, benzyl methacrylate, or the like; unsaturated acid anhydrides such as maleic anhydride, itaconic anhydride, or the like; unsaturated acids such as acrylic acid, methacrylic acid, or the like; and α,β-unsaturated dicarboxylic acid imide compounds such as maleimide, N-methylmaleimide, N-butylmaleimide, N-phenylmaleimide, N-cyclohexylmaleimide, or the like and they may be used alone or two or more of them may be used in form of a mixture. Among them, preferable are methyl methacrylate, N-phenylmaleimide, and N-cyclohexylmaleimide. The amount to be used of the above-mentioned other copolymerizable monomers is preferably 0 to 30% and more preferably 0 to 25% when the amount of the entire monomer mixture is 100%. If the amount to be used of the other copolymerizable monomers exceeds 30%, the balance among the surface property of a blow molded article, impact resistance, heat resistance, blow moldability, suppressing adhesion of polished powder and dust, and resistance to adhesion to a metal tends to be lowered.

The Graft Copolymer (A-2): (Hereinafter, Also Referred to as "Component (A-2)")

The component (A-2) to be used in the present invention is a graft copolymer obtained by polymerizing, in the presence of 5 to 95 parts, preferably 10 to 90 parts of a rubber type polymer, 95 to 5 parts, preferably 90 to 10 parts of a monomer mixture containing 10 to 40%, preferably 10 to 35% of a vinyl cyanide compound and 60 to 90%, preferably 65 to 90% of an aromatic vinyl compound (the total of the monomers being 100% by weight) in such a manner that the total of the rubber type polymer and the monomer mixture is adjusted to be 100 parts. However, α,β-unsaturated glycidyl ester compound is not included as a monomer.

In the above-mentioned component (A-2), if the amount of the rubber type polymer is less than 5 parts, the impact resistance is lowered and on the other hand, if it exceeds 95 parts, the heat resistance, blow moldability, and secondary processability such as sanding are lowered. Further, if the amount of the vinyl cyanide compound is less than 10%, the chemical resistance is lowered and on the other hand, if it exceeds 40%, the heat resistance is lowered. Furthermore, if the amount of the aromatic vinyl compound is less than 60%, the moldability becomes insufficient and on the other hand, if it exceeds 90%, the impact resistance is lowered.

The rubber type polymer to be used in producing the above-mentioned component (A-2) is the same as the rubber type polymer used in producing the above-mentioned component (A-1).

The vinyl cyanide compound to be used in producing the above-mentioned component (A-2) is the same as the vinyl cyanide compound used in producing the above-mentioned component (A-1).

The aromatic vinyl compound to be used in producing the above-mentioned component (A-2) is the same as the aromatic vinyl compound used in producing the above-mentioned component (A-1).

The monomers to be used in production of the above-mentioned component (A-2) may contain, if necessary, other copolymerizable vinyl based compounds. Examples of the other copolymerizable vinyl based compounds are the same as those of the other copolymerizable vinyl based compounds used in production of the component (A-1), however, α,β-unsaturated glycidyl ester compound is excluded. The amount to be used of the above-mentioned other copolymerizable monomers is preferably 0 to 30% and more preferably 0 to 25% in the case the amount of the entire monomer mixture is 100%. If the amount to be used of the other copolymerizable monomers exceeds 30%, the balance among the surface property of a blow molded article, impact resistance, heat resistance, blow moldability, suppressing adhesion of polished powder and dust, and resistance to adhesion to a metal tends to be lowered.

The Copolymer (A-3): (Hereinafter, Also Referred to as "Component (A-3)")

The component (A-3) to be used in the present invention is a copolymer obtained by polymerizing a monomer mixture containing 5 to 40%, preferably 10 to 40%, and more preferably 10 to 35% of a vinyl cyanide compound, 45 to 95%, preferably 60 to 90%, and more preferably 65 to 90% of an aromatic vinyl compound, and 0 to 50%, preferably 0 to 30%, and more preferably 0 to 25% of other vinyl based compounds copolymerizable with these monomers (the total of the monomers being 100% by weight). If the amount of the vinyl cyanide compound is less than 5%, the chemical resistance is lowered, and on the other hand, if it exceeds 40%, the heat resistance is lowered. Furthermore, if the amount of the aromatic vinyl compound is less than 45%, the moldability becomes insufficient and on the other hand, if it exceeds 95%, the impact resistance is lowered. If the amount of the other copolymerizable vinyl based compounds exceeds 50%, the balance among the surface property of a blow molded article, impact resistance, heat resistance, blow moldability, suppressing adhesion of polished powder and dust, and resistance to adhesion to a metal is lowered.

The vinyl cyanide compound to be used in producing the above-mentioned component (A-3) is the same as the vinyl cyanide compound used in producing the above-mentioned component (A-1).

The aromatic vinyl compound to be used in producing the above-mentioned component (A-3) is the same as the aromatic vinyl compound used in producing the above-mentioned component (A-1).

The other copolymerizable vinyl compounds to be used in producing the above-mentioned component (A-3) are the same as the other copolymerizable vinyl compounds used in producing the above-mentioned component (A-1).

Next, a production method of the styrene based resin composition (A) will be described.

The mixing ratios of the components (A-1), (A-2) and (A-3) in the styrene based resin compound (A) are 0.1 to 30%, preferably 0.5 to 20%, more preferably 1 to 15%, and even more preferably 1 to 7% for the component (A-1); 1 to 54.9%, preferably 1 to 44.5%, more preferably 1 to 39%, and even more preferably 1 to 34% for the component (A-2); and 45 to 95%, preferably 55 to 93%, more preferably 60 to 88%, and even more preferably 65 to 86% for the component (A-3).

If the ratio of the component (A-1) is less than 0.1%, the effect of suppressing formation of the recesses becomes insufficient and the surface property of the molded article is lowered, and on the other hand, if it exceeds 30%, blow moldability such as resistance to drawdown, secondary processability, and heat resistance are lowered. Further, the ratio of the component (A-2) is less than 1%, the impact resistance becomes insufficient, and on the other hand, if it exceeds 54.9%, blow moldability, secondary processability, and heat resistance are lowered. Furthermore, the ratio of the component (A-3) is less than 45%, blow moldability and secondary processability are lowered, and if it exceeds 95%, the impact resistance becomes insufficient.

In addition, the component (A-3) may contain free copolymers (copolymers which are not grafted to the rubber type polymers) generated at the time of producing the component (A-1) and component (A-2).

A content of the rubber type polymers in the entire thermoplastic resin composition for blow molding of the present invention is preferably 3 to 25%, more preferably 5 to 20%, and even more preferably 10 to 20%. If the content of the rubber type polymers is less than 3%, the impact resistance tends to be lowered and on the other hand, if it exceeds 25%, the heat resistance of the molded article tends to be lowered.

Further, the content of the α,β-unsaturated glycidyl ester compound in the entire thermoplastic resin composition for blow molding of the present invention is preferably 0.001 to 5% from the viewpoints of the surface property of the molded article and impact resistance.

The graft copolymers (A-1) and (A-2) can be produced by graft polymerization of the above-mentioned monomer components by a method of emulsion polymerization, suspension polymerization, solution polymerization, bulk polymerization, or a combined method thereof in the presence of the above-mentioned rubber type copolymer. Among these, the emulsion polymerization is preferable. In the above-mentioned graft polymerization, a polymerization initiator, a chain transfer agent, an emulsifier (in the case of the emulsion polymerization), or the like which have been commonly used can be employed. The monomer mixture to be used for producing the graft copolymers may be charged in entire amount at a time in the presence of the rubber type polymer and polymerized or they may be dividedly or continuously added little by little and polymerized. Further, polymerization may be carried out by combining these methods. Furthermore, the entire amount or a portion of the rubber type polymer may be added during the polymerization of the monomer mixture.

As the above-mentioned polymerization initiator, common initiators are used corresponding to the polymerization method. Examples of an initiator for emulsion polymerization may be redox initiators combining organic peroxides such as cumene hydroperoxide, diisopropylbenzene hydroperoxide, p-menthane hydroperoxide or the like, with reducing agents such as sugar-containing pyrophosphoric acid, sulfoxylate, or the like; persulfates such as potassium persulfate; and peroxides such as benzoyl peroxide (BPO), azobisisobutyronitrile, lauroyl peroxide, tert-butyl peroxylaurate, tert-butyl peroxymonocarbonate, or the like. The initiator may be an oil-soluble type or a water-soluble type or those may be used in combination. The above-mentioned initiators can be used alone or two or more of them can be used in combination. The amount to be used of the above-mentioned polymerization initiator is preferably 0.1 to 1.5% and more preferably 0.2 to 0.7% based on the entire monomer components. In addition, the polymerization initiator may be added at a time or continuously to the polymerization system.

Further, examples of the chain transfer agent include mercaptans such as octyl mercaptan, n-dodecyl mercaptan, tert-dodecyl mercaptan, n-hexamethyl mercaptan, n-tetradecyl mercaptan, tert-tetradecyl mercaptan, or the like; terpinolenes; and α-methylstyrene dimmers. The above-mentioned chain transfer agents may be used alone or two or more of them may be used in combination. The amount to be used of the above-mentioned chain transfer agent is preferably 0 to 5% based on the entire monomers. In addition, the chain transfer agent may be added at a time or continuously to the polymerization system.

Examples of the above-mentioned emulsifier include an anionic surfactant and a nonionic surfactant. Examples of the anionic surfactant may be sulfuric acid ester of a higher alcohol, salts of alkylbenzenesulfonic acid such as dodecylbenzenesulfonic acid; fatty acid sulfonic acid salts such as sodium lauryl sulfate; higher fatty acid sulfonic acid salts and fatty acid phosphoric acid salts. Further, examples of the nonionic surfactant include alkyl ester type compounds of polyethylene glycol and alkyl ether compounds of polyethylene glycol. The above-mentioned emulsifier may be used alone or two or more of them may be used in combination. The amount to be used of the above-mentioned emulsifier is preferably 0.3 to 5% based on the entire monomers.

The emulsion polymerization can be carried out in known conditions in accordance with the types of vinyl based monomers and polymerization initiators. Latexes obtained by the emulsion polymerization are generally refined by coagulating them with a coagulant, making the polymer components be a powder, and thereafter washing the powder with water and drying the powder. As the coagulant, inorganic salts such as calcium chloride, magnesium sulfate, magnesium chloride, and sodium chloride; inorganic acid such as sulfuric acid and hydrochloric acid; and organic acids such as acetic acid and lactic acid may be employed.

In the case of producing a graft copolymer containing two or more of the above-mentioned graft copolymers, resins may be isolated from the respective latexes and mixed, however, as another method, a mixture of latexes containing the respective resins can be coagulated.

Conventionally known methods can be applied to a production method of the above-mentioned graft polymers by solution polymerization, bulk polymerization, and bulk-suspension polymerization.

The graft ratio of the above-mentioned graft copolymers (A-1) and (A-2) is generally 10 to 200%, preferably 30 to 120%, and more preferably 40 to 80%. If the graft ratio is less than 10%, the impact resistance of the molded article containing the thermoplastic resin composition for blow molding of the present invention tends to be lowered, and on the other hand, if the graft ratio exceeds 200%, moldability tends to be lowered.

Herein, the graft ratio (% by weight) can be calculated according to the following equation (1):

$$\text{Graft ratio (\% by weight)} = \{(T-S)/S\} \times 100 \quad (1)$$

In the above-mentioned equation (1), T denotes a weight (g) of an insoluble content obtained by charging 1 g of the above-mentioned graft copolymer (A-1) or (A-2) into 20 ml of acetone, shaking the mixture for 2 hours by a shaking apparatus, successively carrying out centrifugal separation for 60 minutes by a centrifuge separator (rotation speed: 23,000 rpm), and thus separating the insoluble content and the soluble content. S denotes the weight (g) of the rubber type polymer contained in 1 g of the graft copolymer (A-1) or (A-2).

The above-mentioned graft ratio can be easily controlled by adjusting the types and amounts of a polymerization initiator, a chain transfer agent, an emulsifier, a solvent, or the like and also a polymerization time, a polymerization temperature, or a charging manner in the case of producing the above-mentioned graft copolymers.

The above-mentioned copolymer (A-3) can be produced by polymerizing a monomer mixture using a similar polymerization initiator to those which are employed for producing the above-mentioned graft copolymers (A-1) and (A-2). A polymerization method is preferably solution polymerization, emulsion polymerization, bulk polymerization, or suspension polymerization, or may be a production method by combining them. The method for producing the copolymer (A-3) may be a method using a polymerization initiator or a thermal polymerization method using no polymerization initiator or a method by combining them.

The limiting viscosity [η] of the acetone-soluble content of the above-mentioned copolymer (A-3) (measured at 30° C. in methyl ethyl ketone) is preferably 0.1 to 1.5 dl/g, more preferably 0.1 to 1.0 dl/g, even more preferably 0.2 to 0.8 dl/g, and especially preferably 0.3 to 0.7 dl/g. If the limiting viscosity [η] is less than 0.1 dl/g, the resistance to drawdown is insufficient at the time of blow molding and a parison tends to be broken or dropped, and the thickness of the molded article tends to become uneven and further, the impact resistance, chemical resistance, and oil-proofness tend to be decreased. On the other hand, if the limiting viscosity [η] exceeds 1.5 dl/g, the blow moldability tends to be lowered.

The limiting viscosity [η] is measured by the following method. At first, the acetone-soluble content (acetonitrile in the case of an acrylic rubber) of the copolymer is dissolved in methyl ethyl ketone and 5 samples with different concentrations are produced. Next, the reduced viscosity is measured at 30° C. for each concentration using an Ubbelohde viscometer and from the results, the limiting viscosity [η] is calculated. The unit is dl/g.

After production of the respective components (A-1), (A-2) and (A-3) of the styrene based resin composition (A), blending, coagulation, granulation (pelletization) and the like may be also carried out by known methods. For example, the styrene based resin composition (A) may be obtained by salting-out, coagulating, dewatering, and drying a mixture of the respective latexes of the above-mentioned graft copolymer (A-1), graft copolymer (A-2), and copolymer (A-3) to obtain a powder, mixing the powder by a Henshel mixer, and pelletizing the powder by melt extrusion by a uniaxial or multi-axial extruder. Further, it may be obtained by coagulating the above-mentioned mixture of the latexes containing the respective resins of the above-mentioned graft copolymer (A-1), graft copolymer (A-2), and copolymer (A-3).

The graft ratio of the styrene based resin composition (A) is generally 10 to 200%, preferably 20 to 120%, and more preferably 30 to 80%. If the graft ratio is less than 10%, the impact resistance of the molded article containing the thermoplastic resin composition for blow molding of the present invention tends to be lowered and on the other hand, if the graft ratio exceeds 200%, the moldability tends to be lowered.

The limiting viscosity [η] of the acetone-soluble content of the above-mentioned styrene based resin composition (A) (measured at 30° C. in methyl ethyl ketone) is preferably 0.1 to 1.5 dl/g, more preferably 0.1 to 1.0 dl/g, even more preferably 0.2 to 0.8 dl/g, and especially preferably 0.3 to 0.7 dl/g. If the limiting viscosity [η] is less than 0.1 dl/g, the resistance to drawdown is insufficient at the time of blow molding and a parison tends to be broken or dropped, and the thickness of the molded article tends to become uneven and further, the impact resistance, chemical resistance, and oil-proofness tend to be decreased. On the other hand, if the limiting viscosity [η] exceeds 1.5 dl/g, the blow moldability tends to be lowered.

Antistatic Agent B: (Hereinafter, Also Referred to as "Component (B)")

In the present invention, the antistatic agent (B) with a melting point of 170° C. or lower is added in an amount of 0.1 to 10 parts, preferably 0.5 to 7 parts, and more preferably 2 to 4 parts based on 100 parts of the above-mentioned styrene based resin composition (A).

If the amount of the antistatic agent (B) is less than 0.1 part, the effect of suppressing adhesion of polished powder of a molded article generated in the sanding process before coating and dust during storage until coating to the molded article surface becomes insufficient and the resin composition becomes easy to adhere to a metal. On the other hand, if the amount of the antistatic agent (B) exceeds 10 parts, the resistance to drawdown, heat resistance, and surface property are lowered.

Further, if the melting point of the antistatic agent (B) exceeds 170° C., it becomes difficult for the component having the antistatic effect to bleed to the molded article surface, and the effect of suppressing adhesion of polished powder of a molded article generated in the sanding process before coating and dust during storage until coating to the molded article surface becomes insufficient.

The above-mentioned melting point means a melting point measured by DSC (differential scanning calorimeter) or a softening point in the case that no melting point clearly appears, and substantial measurement methods for them are as follows.

"DSC"
Measurement apparatus: TA DSC 2910 model
Manufacturer: TA-Instruments
Measurement conditions: according to JIS K7121;
nitrogen gas flow rate: 50 ml/min.;
heating rate: 20° C./min.

"Softening Point"
(1) A beaker containing an antistatic agent is set in an oil bath or a sand bath.
(2) While the antistatic agent in the beaker is stirred with a thermometer, the temperature is increased.
(3) The softening point is defined as a point at which the granular antistatic agent begins melting (becoming viscous).

An antistatic agent (B) to be used in the present invention is not particularly limited as far as it has a melting point at 170° C. or lower; for example, low molecular weight type antistatic agents and high molecular weight type antistatic agents can be exemplified. These antistatic agents may be any of anionic type antistatic agents, cationic type antistatic agents and nonionic antistatic agents, and can be used alone or two or more can be used in combination.

Examples of the low molecular weight type antistatic agents include anionic type antistatic agents, cationic type antistatic agents, nonionic antistatic agents, metal alkoxides and their derivatives, complex compounds, organic boron compounds, coated silica, and the like.

Examples of the anionic type antistatic agents include sodium alkylsulfonate, sodium alkylbenzenesulfonate, alkyl phosphate, and the like; examples of the cationic type antistatic agents include phosphonium alkylsulfonate, phosphonium alkylbenzenesulfonate, tetraalkylammonium salts, trialkylbenzylammonium salts, quaternary ammonium salts, and the like; examples of the nonionic type antistatic agents include polyhydric alcohol derivatives, alkylethanolamines, alkylbetaines, sulfobetaine derivatives and the like; examples of metal alkoxides and their derivatives include alkoxysilanes, alkoxytitaniums, alkoxyzirconiums, and the like.

The alkyl group is preferably a linear alkyl group having 4 to 20 carbon atoms.

Examples of the high molecular weight type antistatic agents include polyalkylene oxide based polymers, acryl based copolymers, polyether based copolymers, quaternary ammonium salt based copolymers, betaine based copolymers, polyamide based elastomers, polyester based elastomers, polyalkylbenzenesulfonic acid salts, ionomer resins, and the like.

Examples of the polyalkylene oxide based polymers include polyethylene oxide-epichlorohydrin copolymers; examples of the acryl based copolymers include polyethylene glycol-(meth)acrylate copolymers and methoxypolyethylene glycol-(meth)acrylate copolymers; examples of polyether based compounds include polyether amides, polyether ester amides, polyether amide imides, polyether esters and the like; examples of the quaternary ammonium salt based copolymers include quaternary ammonium salt group-containing (meth)acrylate copolymers, quaternary ammonium salt group-containing maleimide copolymers, quaternary ammonium salt group-containing methacrylimide copolymers and the like; and examples of the betaine based copolymers are carbobetaine graft copolymers and the like.

Any antistatic agent can be favorably used as the antistatic agent (B) used in the present invention as far as it has melting point at 170° C. or lower, and the melting point of the antistatic agent (B) is preferably 40 to 170° C., more preferably 50 to 170° C., even more preferably 60 to 170° C., especially preferably 70 to 170° C., and most preferably 80 to 170° C. If the melting point exceeds 170° C., the effect of suppressing adhesion of polished powder of a molded article generated in the sanding process before coating and dust during storage until coating to the molded article surface cannot be exhibited. To suppress adhesion of polished powder and dust, it is preferable for a component which has the antistatic effect to bleed most quickly to the blow molded article surface after blow molding. However, since, as compared with injection molding, blowing molding is carried out at a low resin temperature and a low shear rate speed at the time of molding, it is supposed that an antistatic agent with a higher melting point is difficult to be evaporated and to bleed to the surface of the blow molded article than an antistatic agent with a lower melting point. Accordingly, it is preferable to use a low molecular weight type antistatic agent with a low melting point. However, taking it into consideration that if a large amount of the low molecular weight type antistatic agent with a low melting point is added to the thermoplastic resin composition for blow molding, the heat resistance tends to be lowered, it is particularly preferable to use a low molecular weight type antistatic agent with a melting point of 80 to 170° C.

Further, in the present invention, the thermoplastic resin composition for blow molding comprising the styrene based resin composition (A) and the antistatic agent (B) can further contain at least one compound (C) selected from the group consisting of hydroxides and carbonates of alkali metals, hydroxides, carbonates, and oxides of alkaline earth metals, talc (D), and a polyolefin based wax (E).

At Least One Compound (C) Selected from the Group Consisting of Hydroxides and Carbonates of Alkali Metals, Hydroxides, Carbonates, and Oxides of Alkaline Earth Metals: (Hereinafter, Also Referred to as "Component (C)")

Examples of the hydroxides of alkali metals as the component (C) used in the present invention include lithium hydroxide, sodium hydroxide, potassium hydroxide, rubidium hydroxide, cesium hydroxide and the like; and examples of carbonates of alkali metals include lithium carbonate, sodium carbonate, potassium carbonate, rubidium carbonate, cesium carbonate and the like.

Examples of the hydroxides of alkaline earth metals include beryllium hydroxide, magnesium hydroxide, calcium hydroxide, strontium hydroxide, barium hydroxide and the like; examples of the carbonates of alkaline earth metals include beryllium carbonate, magnesium carbonate, strontium carbonate, barium carbonate and the like; and examples of the oxides of alkaline earth metals include beryllium oxide, magnesium oxide, calcium oxide, strontium oxide, barium oxide and the like.

These compounds may be used alone or two or more of them may be used in combination and particularly, magnesium hydroxide, calcium hydroxide, magnesium oxide, calcium oxide, sodium carbonate, and magnesium carbonate are preferable from the viewpoints of the effect, safety, and economy, and magnesium hydroxide is particularly preferable.

The amount to be used of the component (C) is preferably 0.01 to 10 parts, more preferably 0.1 to 3 parts, and even more preferably 0.1 to 1 part based on 100 parts of the styrene based resin composition (A). If the amount of the component (C) is less than 0.01 part, the effect of suppressing increase of the viscosity of the resin when the resin is stagnated in a barrel of a molding apparatus becomes insufficient and on the other hand, if it exceeds 10 parts, the impact strength of the molded article tends to be lowered.

The average particle diameter (weight average particle diameter) of the hydroxides and carbonates of alkali metals, hydroxides, carbonates, and oxides of alkaline earth metals for the component (C) is preferably 4 μm or smaller. If the average particle diameter exceeds 4 μm, the impact strength tends to be lowered. The hydroxides and carbonates of alkali metals, hydroxides, carbonates, and oxides of alkaline earth metals may be used after a surface treatment with stearic acid, a silane coupling agent, or the like.

Talc (D): (Hereinafter, Also Referred to as "Component (D)")

The talc (D) to be used in the present invention is not particularly limited, however it is preferred to use magnesium silicate hydrate ($4SiO_2$-$3MgO$—$H_2O$) containing, as main components, about 60% by weight of $SiO_2$ and about 30% by weight of $MgO_2$.

The amount to be used of the component (D) is preferably 0.01 to 5 parts, more preferably 0.1 to 3 parts, and even more preferably 0.3 to 1 part based on 100 parts of the styrene based resin composition (A). If the amount of the component (D) is less than 0.01 part, the effect of providing a resin with resistance to adhesion to a metal becomes insufficient, and on the other hand, if it exceeds 5 parts, the impact strength of the molded article tends to be lowered.

The average particle diameter (weight average particle diameter) of the talc (D) is preferably 5 μm or smaller, and if it exceeds 5 μm, the impact strength tends to be lowered. Those with different average particle diameters may be used in combination for the talc (D). Further, talc may be used after a surface treatment with a silane coupling agent or the like.

Polyolefin Based Wax (E): (Hereinafter, Also Referred to as "Component (E)")

As the polyolefin based wax (E) used in the present invention, polyethylene wax is preferable. The number average molecular weight is not particularly limited, however it is preferably 3000 or lower and more preferably 300 to 1500. If the number average molecular weight exceeds 3000, the processability at the time of blow molding tends to be lowered.

The polyolefin based wax (E) can be blended in an amount of preferably 0.01 to 5 parts, more preferably 0.1 to 3 parts, and even more preferably 0.3 to 1 part based on 100 parts of the styrene based resin composition (A).

If the amount of the component (E) is less than 0.01 part, the secondary processability such as sanding property (easiness for sanding) is lowered, and on the other hand, if it exceeds 5 parts, the heat resistance of the molded article tends to be lowered and the surface appearance due to bleeding tends to be deteriorated.

The thermoplastic resin composition for blow molding of the present invention may further contain, if necessary, various kinds of additives such as an antioxidant, a lubricant, an inorganic filler, an organic filler, a metal filler, a fibrous filler, graphite, carbon nanotubes, a thermal stabilizer, an ultraviolet absorbent, a frame retardant, an anti-aging agent, a plasticizer, an anti-bacterial agent, a coloring agent, a foaming agent, within the range where the object of the present invention is not damaged.

Among them, an antioxidant is preferably used for improving thermal stability such as suppression of impact strength decrease by heating hysteresis. Further, the lubricant is preferably used for improving the moldability at the time of blow molding, resistance to adhesion to a metal, surface property of the blow molded article and impact strength, and lowering the winding property of the resin at the time of drawdown.

Antioxidant (F): (Hereinafter, Also Referred to as Component (F))

As the antioxidant (F), it is preferable to add one or more of antioxidants selected from the group consisting of phenol based antioxidants, phosphite based antioxidants, and thioether based antioxidants. Further, combined use of the phenol based antioxidants, phosphite based antioxidants, and thioether based antioxidants causes a synergetic effect and thus even with a small amount, a significant effect can be obtained.

The amount to be used of the component (F) is preferably 0.1 to 5 parts and more preferably 0.2 to 3 parts based on 100 parts of the styrene based resin composition (A). If the amount of the component (F) is less than 0.1 part, the addition effect tends to exhibit insufficiently, and on the other hand, if it exceeds 5 parts, the above-mentioned addition effect tends to be saturated and the heat resistance tends to be lowered.

Lubricant (G): (Hereinafter, Also Referred to as Component (G))

As the lubricant (G), it is possible to use one or more kind lubricants selected from amide based lubricants such as fatty acid amides, alkylene-bis-fatty acid amides and the like; hydrocarbon based lubricants, fatty acid based lubricants, higher alcohol based lubricants, ester based lubricants, metal soap and the like.

The amount to be used of the component (G) is preferably 0.1 to 5 parts and more preferably 0.2 to 3 parts based on 100 parts of the styrene based resin composition (A). If the amount of the component (G) is less than 0.1 part, the addition effect tends to exhibit insufficiently and on the other hand, if it exceeds 5 parts, the above-mentioned addition effect tends to be saturated and the heat resistance tends to be lowered.

Further, the thermoplastic resin composition for blow molding of the present invention may contain, if necessary, other resins such as polyethylene, polybutylene terephthalate, polyethylene terephthalate, polycarbonate, polyamide and the like within the range where the object of the present invention is not damaged.

The thermoplastic resin composition for blow molding of the present invention can be produced by mixing the respective components at the prescribed mixing ratios by a tumbler mixer or a Henshel mixer or the like, and melting and kneading under suitable conditions using a mixing apparatus such as a uniaxial extruder, a biaxial extruder, Bumbury's mixer, a kneader, a loader, a feeder-loader and the like. Further, at the time of mixing and kneading the respective components, the respective components may be charged at a time and mixed or may be added and kneaded in multi-steps or dividedly. After kneading using a Bumbury's mixer, a kneader, or the like, the mixture may be pelletized by an extruder. The melting and kneading temperature is generally 200 to 300° C. and preferably 220 to 280° C.

The thermoplastic resin composition for blow molding of the present invention obtained in such a manner as aforesaid may be molded into various kinds of molded articles by injection molding, sheet-forming molding, vacuum molding, profile extrusion molding, foam molding, injection compression molding, press molding, blow molding or the like, and it is particularly preferably molded by blow molding.

Examples of the above-mentioned blow molding, besides common blow molding methods, include a sheet parison method, a cold parison method, a bottle pack method, an injection blow method, a stretching blow method and the like. Any method among them may be employed, however, from the viewpoints of blow up property and surface property, blow molding with a parison or a sheet heated to 200° C. or higher is preferable. Further, in order to obtain a better effect, at the time of expanding a parison or a sheet, an inert gas such as nitrogen, carbon dioxide, helium, neon, argon, or the like may be employed in place of air.

The thermoplastic resin composition for blow molding of the present invention and its molded article can be used preferably for automobiles and two-wheel vehicles, e.g. a bumper, an air spoiler, a rear spoiler, a radiator grill, a scooter housing and the like. They can be used preferably for housing use, e.g. a partition, a top panel of a desk, furniture, a side cover in a bathtub, and the like; and domestic electric appliances, e.g. a door of a refrigerator, various kinds of housings, and office instruments, and the like.

EXAMPLES

The present invention will be explained in more detail with reference to Examples and Comparative Examples, however, the present invention should not be limited to these Examples.
(1) Production of Thermoplastic Resin Composition for Blow Molding
(1-1) Preparation of Styrene Based Resin (A)
Graft Copolymer (A-1)

A polymerization container equipped with a stirrer was charged with 280 parts of water, 70 parts (in terms of a solid content) of polybutadiene latex (average particle diameter: 0.18 μm, gel content: 90%), 0.3 part of sodium formaldehyde sulfoxylate, 0.0025 part of ferrous sulfate, and 0.01 part of ethylenediaminetetraacetic acid disodium salt and after deoxidation, the mixture was heated to 60° C. with stirring in nitrogen current, and successively, 30 parts of a monomer mixture containing 3 parts (10% in the monomer mixture) of glycidyl methacrylate, 6 parts (20% in the same) of acrylonitrile, and 21 parts (70% in the same) of styrene and 0.3 part of cumene hydroperoxide was continuously added dropwise at 60° C. over 5 hours. After completion of dropwise addition, the polymerization temperature was increased to 65° C. and after 1 hour stirring was carried out, the polymerization was finished to obtain a latex. The latex was salted out with calcium chloride and washing, filtering and drying processes were carried out to obtain a powdery graft copolymer (a-1). The polymerization conversion was 98% and the graft ratio was 37%. About 10% of the monomer mixture was not grafted onto polybutadiene latex and monomers were copolymerized in the monomer mixture and therefore, a graft copolymer (a-1) was a mixture containing about 96% of a graft copolymer (A-1) and about 4% of a copolymer (A-3).
Graft Copolymer (A-2)

A graft copolymer (a-2) was obtained in the same manner as that for obtaining the graft copolymer (a-1), except that 70 parts (in terms of the solid content) of polybutadiene latex (average particle diameter: 0.26 μm, gel content: 90%) was used as the rubber type polymer and that the composition of 30 parts of the monomer mixture was changed to a monomer mixture containing 7 parts (23% in the monomer mixture) of acrylonitrile and 23 parts (77% in the same) of styrene. The polymerization conversion was 98% and the graft ratio was 36%. About 10% of the monomer mixture was not grafted onto a polybutadiene latex and monomers were copolymerized in the monomer mixture and therefore, the graft copolymer (a-2) was a mixture containing about 96% of a graft copolymer (A-2) and about 4% of a copolymer (A-3).
Copolymer (A-3)
Copolymer (a-3-1)

A polymerization container equipped with a stirrer was charged with 250 parts of water and 1.0 part of sodium palmitate and after deoxidation, the mixture was heated to 70° C. with stirring in nitrogen current. Further, 0.4 part of sodium formaldehyde sulfoxylate, 0.0025 part of ferrous sulfate, and 0.01 part of ethylenediaminetetraacetic acid disodium salt were charged, then 100 parts of a monomer mixture containing 50 parts (50% in the monomer mixture) of α-methylstyrene, 29 parts (29% in the same) of acrylonitrile, and 21 parts (21% in the same) of styrene and 0.1 part of tert-dodecylmercaptan were mixed and continuously added dropwise at 70° C. over 7 hours. After completion of dropwise addition, the polymerization temperature was increased to 75° C. and after 1 hour stirring was carried out, the polymerization was finished to obtain a latex. The latex was salted out with calcium chloride and washing, filtering and drying processes were carried out to obtain a powdery graft copolymer (a-3-1). The polymerization conversion was 98% and the limiting viscosity [η] (at 30° C. in methyl ethyl ketone) was 0.67 dl/g.
Copolymer (a-3-2)

A copolymer (a-3-2) was obtained in the same manner as the copolymer (a-3-1), except that the composition of the 100 parts of the monomer mixture was changed to a monomer mixture containing 50 parts (50% in the monomer mixture) of α-methylstyrene, 29 parts (29% in the same) of acrylonitrile, and 21 parts (21% in the same) of styrene and that the amount of tert-dodecylmercaptan was changed to 0.42 part. The polymerization conversion was 98% and the limiting viscosity [η] (at 30° C. in methyl ethyl ketone) was 0.44 dl/g.
Copolymer (a-3-3)

A copolymer (a-3-3) was obtained in the same manner as the copolymer (a-3-1), except that the composition of the 100 parts of the monomer mixture was changed to a monomer mixture containing 70 parts (70% in the monomer mixture) of α-methylstyrene, 26 parts (26% in the same) of acrylonitrile, and 4 parts (4% in the same) of styrene and that the amount of tert-dodecylmercaptan was changed to 0.2 part. The polymerization conversion was 98% and the limiting viscosity [η] (at 30° C. in methyl ethyl ketone) was 0.51 dl/g.
Copolymer (a-3-4)

N-phenylmalemide-styrene-acrylonitrile terpolymer, "PAS-1460" (trade name: manufactured by Nippon Shokubai Co., Ltd.) was used. The contents of N-phenylmalemide, styrene, and acrylonitrile were 40%, 51%, and 9%, respectively.
(1-2) Antistatic Agent (B)
(b-1) Aliphatic sulfonate, an anionic surfactant, "TB-160" (trade name: manufactured by Matsumoto Yushi Seiyaku Co., Ltd., melting point 162° C. (value in catalog (softening point) 115° C.) was used.
(b-2) A mixture of polyoxyethylene alkyl (C8 to C18) amine, a cationic surfactant, and magnesium stearate (melting point 49° C. (value in catalog 55° C.)) was used.
(b-3) Stearic acid monoglyceride (glycerin fatty acid ester), a nonionic surfactant, "RIKEMAL S-100" (trade name: manufactured by Riken Vitamin Co., Ltd., melting point 74° C. (value in catalog 66° C.)) was used.
(b-4) Aliphatic mono- and di-glyceride boric acid ester, a high molecular weigh type antistatic agent, "RESISTAT PE-139" (trade name: manufactured by Dai-ichi Kogyo Seiyaku Co., Ltd., melting point 65° C. (value in catalog 59 to 65° C.)) was used.
(b-5) Anionic surfactant-mixed polyether copolymerized ester "TEP-008" (trade name: manufactured by Takemoto Oil and Fat Co., Ltd., melting point 198° C. (value in catalog 180° C.)) was used.
(b-6) Polyether ester amide block polymer "PELESTAT M-140" (trade name: manufactured by Sanyo Chemical Industries, Ltd., melting point 192° C. (value in catalog 198° C.)) was used.
(1-3) Component (C)
(c-1): Magnesium hydroxide "KISUMA 5" (trade name: manufactured by Kyowa Chemical Industry Co., Ltd., average particle diameter 0.8 μm) was used.

(1-4) Talc (D)
(d-1): Fine powder talc "MICRO ACE L-1" (trade name: manufactured by Nippon Talc Co., Ltd., average particle diameter 1.8 μm) was used.
(1-5) Polyolefin Based Wax (E)
(e-1): Polyethylene wax (low molecular weight polyethylene) "Neowax ACL" (trade name: manufactured by Yasuhara Chemical Co., Ltd., number average molecular weight 700) was used.
(1-6) Antioxidant (F)
(f-1): Phenol based antioxidant "ADK STAB AO-50" (trade name: manufactured by ADEKA Corporation) was used.
(f-2): Phosphite based antioxidant "ADK STAB PEP-36" (trade name: manufactured by ADEKA Corporation) was used.
(1-7) Lubricant (G)
(g-1): Ethylene bisstearic acid amide "KAO WAX EB-G" (trade name: manufactured by Kao Corporation) was used.

Example 1

As shown in Table 1, 1.0 part of the antioxidant (b-1), 0.5 part of the component (c-1), 0.5 part of talc (d-1), 0.5 part of the polyolefin based wax (e-1), 0.5 part of the antioxidant (f-1), 0.3 part of the antioxidant (f-2), and 0.5 part of the lubricant (g-1) were added to 100 parts of the styrene based resin composition (A) containing 3.0 parts of the graft copolymer (a-1), 24.3 parts of the graft copolymer (a-2), 43.0 parts of the copolymer (a-3-1), 9.0 parts of the copolymer (a-3-2), and 20.7 parts of the copolymer (a-3-3) (corresponding to 2.9 parts of the graft copolymer (A-1), 23.3 parts of the graft copolymer (A-2), and 73.8 parts of the copolymer (A-3)) and the resultant mixture was mixed by a Henshel mixer, and kneaded and pelletized at a set temperature of 270° C. using a vent type uniaxial extruder (NVC-50, manufactured by Nakatani Kikai Co., Ltd) to obtain a resin composition for blow molding.

Examples 2 to 19 and Comparative Examples 1 to 7

The resin compositions for blow molding of Examples 2 to 19 and Comparative Examples 1 to 7 were obtained in the same manner as Example 1, except that the compositions were changed as shown in Table 1 and Table 2.

TABLE 1

| | | | | | | Examples | | | | |
|---|---|---|---|---|---|---|---|---|---|---|
| | | | | 1 | 2 | 3 | 4 | 5 | 6 | 7 |
| Blending parts | [A] | a-1 | | 3.0 | 3.0 | 3.0 | 3.0 | 3.0 | 3.0 | 3.0 |
| | | a-2 | | 24.3 | 24.3 | 24.3 | 24.3 | 24.3 | 24.3 | 24.3 |
| | | a-3-1 | | 43.0 | 43.0 | 43.0 | 43.0 | 43.0 | 43.0 | 43.0 |
| | | a-3-2 | | 9.0 | 9.0 | 9.0 | 9.0 | 9.0 | 9.0 | 9.0 |
| | | a-3-3 | | 20.7 | 20.7 | 20.7 | 20.7 | 20.7 | 20.7 | 20.7 |
| | | a-3-4 | | | | | | | | |
| | [B] | b-1 | | 1.0 | 2.0 | 3.0 | 4.0 | 5.0 | 10.0 | |
| | | b-2 | | | | | | | | 1.0 |
| | | b-3 | | | | | | | | |
| | | b-4 | | | | | | | | |
| | | b-5 | | | | | | | | |
| | | b-6 | | | | | | | | |
| | [C] | c-1 | | 0.5 | 0.5 | 0.5 | 0.5 | 0.5 | 0.5 | 0.5 |
| | [D] | d-1 | | 0.5 | 0.5 | 0.5 | 0.5 | 0.5 | 0.5 | 0.5 |
| | [E] | e-1 | | 0.5 | 0.5 | 0.5 | 0.5 | 0.5 | 0.5 | 0.5 |
| | [F] | f-1 | | 0.5 | 0.5 | 0.5 | 0.5 | 0.5 | 0.5 | 0.5 |
| | | f-2 | | 0.3 | 0.3 | 0.3 | 0.3 | 0.3 | 0.3 | 0.3 |
| | [G] | g-1 | | 0.5 | 0.5 | 0.5 | 0.5 | 0.5 | 0.5 | 0.5 |
| Composition | Component A-1 | | % | 2.9 | 2.9 | 2.9 | 2.9 | 2.9 | 2.9 | 2.9 |
| | Component A-2 | | | 23.3 | 23.3 | 23.3 | 23.3 | 23.3 | 23.3 | 23.3 |
| | Component A-3 | | | 73.8 | 73.8 | 73.8 | 73.8 | 73.8 | 73.8 | 73.8 |
| Contents of the below-mentioned components of thermoplastic resin compositions for blow molding | | | | | | | | | | |
| | Rubber type polymer | | | 19.1 | 19.1 | 19.1 | 19.1 | 19.1 | 19.1 | 19.1 |
| | α,β-unsaturated glycidyl ester compound | | | 0.09 | 0.09 | 0.09 | 0.09 | 0.09 | 0.09 | 0.09 |
| Evaluation results | Surface intrinsic resistance | | Ω | 1.0E+14 | 2.1E+12 | 1.6E+10 | 1.4E+10 | 1.3E+10 | 1.2E+10 | 3.5E+14 |
| | Dust adhesion | | | Δ | ◯ | ◯ | ◯ | ◯ | ◯ | Δ |
| | Surface property | | | ◯ | ◯ | ◯ | ◯ | Δ~◯ | Δ | ◯ |
| | Resistance to adhesion to metal | | | ◯ | ◯~⊚ | ⊚ | ⊚ | ⊚ | ⊚ | Δ |
| | Resistance to drawdown | | | ◯ | ◯ | ◯ | ◯ | ◯ | Δ~◯ | ◯ |
| | Deflection temperature under load | | °C. | 95 | 94 | 94 | 93 | 92 | 91 | 93 |
| | Low temperature falling weight impact strength | | J | 42 | 44 | 45 | 45 | 45 | 46 | 40 |

TABLE 1-continued

|  |  |  | Examples | | | | | | |
|---|---|---|---|---|---|---|---|---|---|
|  |  |  | 8 | 9 | 10 | 11 | 12 | 13 | 14 |
| Blending parts | [A] | a-1 | 3.0 | 3.0 | 3.0 | 3.0 | 3.0 | 3.0 | 3.0 |
|  |  | a-2 | 24.3 | 24.3 | 24.3 | 24.3 | 24.3 | 24.3 | 24.3 |
|  |  | a-3-1 | 43.0 | 43.0 | 43.0 | 43.0 | 43.0 | 43.0 | 43.0 |
|  |  | a-3-2 | 9.0 | 9.0 | 9.0 | 9.0 | 9.0 | 9.0 | 9.0 |
|  |  | a-3-3 | 20.7 | 20.7 | 20.7 | 20.7 | 20.7 | 20.7 | 20.7 |
|  |  | a-3-4 |  |  |  |  |  |  |  |
|  | [B] | b-1 |  |  |  |  |  |  | 3.0 |
|  |  | b-2 | 3.0 | 5.0 |  |  |  |  |  |
|  |  | b-3 |  |  | 1.0 | 3.0 | 5.0 |  |  |
|  |  | b-4 |  |  |  |  |  | 1.0 |  |
|  |  | b-5 |  |  |  |  |  |  |  |
|  |  | b-6 |  |  |  |  |  |  |  |
|  | [C] | c-1 | 0.5 | 0.5 | 0.5 | 0.5 | 0.5 | 0.5 |  |
|  | [D] | d-1 | 0.5 | 0.5 | 0.5 | 0.5 | 0.5 | 0.5 |  |
|  | [E] | e-1 | 0.5 | 0.5 | 0.5 | 0.5 | 0.5 | 0.5 |  |
|  | [F] | f-1 | 0.5 | 0.5 | 0.5 | 0.5 | 0.5 | 0.5 | 0.5 |
|  |  | f-2 | 0.3 | 0.3 | 0.3 | 0.3 | 0.3 | 0.3 | 0.3 |
|  | [G] | g-1 | 0.5 | 0.5 | 0.5 | 0.5 | 0.5 | 0.5 | 0.5 |
| Composition | Component A-1 | % | 2.9 | 2.9 | 2.9 | 2.9 | 2.9 | 2.9 | 2.9 |
|  | Component A-2 |  | 23.3 | 23.3 | 23.3 | 23.3 | 23.3 | 23.3 | 23.3 |
|  | Component A-3 |  | 73.8 | 73.8 | 73.8 | 73.8 | 73.8 | 73.8 | 73.8 |
| Contents of the below-mentioned components of thermoplastic resin compositions for blow molding | | | | | | | | | |
|  | Rubber type polymer |  | 19.1 | 19.1 | 19.1 | 19.1 | 19.1 | 19.1 | 19.1 |
|  | α,β-unsaturated glycidyl ester compound |  | 0.09 | 0.09 | 0.09 | 0.09 | 0.09 | 0.09 | 0.09 |
| Evaluation results | Surface intrinsic resistance | Ω | 2.8E+13 | 3.4E+12 | 7.8E+13 | 2.0E+10 | 1.2E+10 | 1.6E+14 | 3.1E+13 |
|  | Dust adhesion |  | Δ | ○ | Δ | ○ | ○ | Δ | Δ |
|  | Surface property |  | ○ | Δ~○ | ○ | ○ | Δ~○ | ○ | Δ |
|  | Resistance to adhesion to metal |  | ○~◎ | ○~◎ | ○ | ○~◎ | ◎ | ○ | X~Δ |
|  | Resistance to drawdown |  | ○ | ○ | ○ | ○ | Δ | ○ | ○ |
|  | Deflection temperature under load | °C. | 89 | 87 | 92 | 88 | 83 | 92 | 93 |
|  | Low temperature falling weight impact strength | J | 40 | 42 | 40 | 42 | 43 | 40 | 43 |

|  |  |  | Examples | | | | | |
|---|---|---|---|---|---|---|---|---|
|  |  |  | 15 | 16 | 17 | 18 | 19 |
| Blending parts | [A] | a-1 | 3.0 | 10.0 | 18.0 | 3.0 | 3.0 |
|  |  | a-2 | 24.3 | 15.6 | 8.1 | 43.4 | 8.1 |
|  |  | a-3-1 | 33.0 | 30.0 | 13.0 | 8.0 | 73.0 |
|  |  | a-3-2 | 9.0 | 30.0 | 54.0 | 9.0 | 9.0 |
|  |  | a-3-3 | 20.7 | 14.4 | 6.9 | 36.6 | 6.9 |
|  |  | a-3-4 | 10.0 |  |  |  |  |
|  | [B] | b-1 | 3.0 | 3.0 | 3.0 | 3.0 | 3.0 |
|  |  | b-2 |  |  |  |  |  |
|  |  | b-3 |  |  |  |  |  |
|  |  | b-4 |  |  |  |  |  |
|  |  | b-5 |  |  |  |  |  |
|  |  | b-6 |  |  |  |  |  |
|  | [C] | c-1 | 0.5 | 0.5 | 0.5 | 0.5 | 0.5 |
|  | [D] | d-1 | 0.5 | 0.5 | 0.5 | 0.5 | 0.5 |
|  | [E] | e-1 | 0.5 | 0.5 | 0.5 | 0.5 | 0.5 |
|  | [F] | f-1 | 0.5 | 0.5 | 0.5 | 0.5 | 0.5 |
|  |  | f-2 | 0.3 | 0.3 | 0.3 | 0.3 | 0.3 |
|  | [G] | g-1 | 0.5 | 0.5 | 0.5 | 0.5 | 0.5 |
| Composition | Component A-1 | % | 2.9 | 9.6 | 17.3 | 2.9 | 2.9 |
|  | Component A-2 |  | 23.3 | 15.0 | 7.8 | 41.6 | 7.8 |
|  | Component A-3 |  | 73.8 | 75.4 | 74.9 | 55.5 | 89.3 |
| Contents of the below-mentioned components of thermoplastic resin compositions for blow molding | | | | | | | | |
|  | Rubber type polymer |  | 19.1 | 17.9 | 18.3 | 32.5 | 7.6 |
|  | α,β-unsaturated glycidyl ester compound |  | 0.09 | 0.30 | 0.54 | 0.09 | 0.09 |

TABLE 1-continued

|  |  |  |  |  |  |  |  |
|---|---|---|---|---|---|---|---|
| Evaluation results | Surface intrinsic resistance | Ω | 2.5E+10 | 2.1E+10 | 1.8E+10 | 3.1E+10 | 1.9E+10 |
|  | Dust adhesion |  | ○ | ○ | ○ | ○ | ○ |
|  | Surface property |  | ○ | Δ~○ | Δ | Δ | ○ |
|  | Resistance to adhesion to metal |  | ◎ | ○ | ○ | ○ | ○ |
|  | Resistance to drawdown |  | Δ | Δ | Δ | Δ | Δ |
|  | Deflection temperature under load | °C. | 98 | 94 | 93 | 86 | 98 |
|  | Low temperature falling weight impact strength | J | 43 | 31 | 13 | 54 | 15 |

Notes:
The component A-3 is the total of a-3-1~4 and a free AS contained in a-1 and a-2.
In Table, "empty space (blank)" indicates "0.0 (No presence)".

TABLE 2

|  |  |  | Comparative Examples |  |  |  |  |  |  |
|---|---|---|---|---|---|---|---|---|---|
|  |  |  | 1 | 2 | 3 | 4 | 5 | 6 | 7 |
| Blending parts | [A] | a-1 | 3.0 | 3.0 |  | 20.0 | 3.0 | 3.0 |  |
|  |  | a-2 | 24.3 | 24.3 | 29.7 |  | 24.3 | 24.3 |  |
|  |  | a-3-1 | 43.0 | 43.0 | 45.0 | 20.0 | 43.0 | 43.0 | 100.0 |
|  |  | a-3-2 | 9.0 | 9.0 |  | 60.0 | 9.0 | 9.0 |  |
|  |  | a-3-3 | 20.7 | 20.7 | 25.3 |  | 20.7 | 20.7 |  |
|  |  | a-3-4 |  |  |  |  |  |  |  |
|  | [B] | b-1 |  | 15.0 | 3.0 | 3.0 |  |  | 3.0 |
|  |  | b-2 |  |  |  |  |  |  |  |
|  |  | b-3 |  |  |  |  |  |  |  |
|  |  | b-4 |  |  |  |  |  |  |  |
|  |  | b-5 |  |  |  |  | 5.0 |  |  |
|  |  | b-6 |  |  |  |  |  | 5.0 |  |
|  | [C] | c-1 | 0.5 | 0.5 | 0.5 | 0.5 | 0.5 | 0.5 | 0.5 |
|  | [D] | d-1 | 0.5 | 0.5 | 0.5 | 0.5 | 0.5 | 0.5 | 0.5 |
|  | [E] | e-1 | 0.5 | 0.5 | 0.5 | 0.5 | 0.5 | 0.5 | 0.5 |
|  | [F] | f-1 | 0.5 | 0.5 | 0.5 | 0.5 | 0.5 | 0.5 | 0.5 |
|  |  | f-2 | 0.3 | 0.3 | 0.3 | 0.3 | 0.3 | 0.3 | 0.3 |
|  | [G] | g-1 | 0.5 | 0.5 | 0.5 | 0.5 | 0.5 | 0.5 | 0.5 |
| Compositions | Component A-1 | % | 2.9 | 2.9 |  | 19.2 | 2.9 | 2.9 |  |
|  | Component A-2 |  | 23.3 | 23.3 | 28.5 |  | 23.3 | 23.3 |  |
|  | Component A-3 |  | 73.8 | 73.8 | 71.5 | 80.8 | 73.8 | 73.8 | 100.0 |
| Contents of the below-mentioned components of thermoplastic resin compositions for blow molding |  |  |  |  |  |  |  |  |  |
|  | Rubber type polymer |  | 19.1 | 19.1 | 20.8 | 14.0 | 19.1 | 19.1 |  |
|  | α,β-unsaturated glycidyl ester compound |  | 0.09 | 0.09 |  | 0.50 | 0.09 | 0.09 |  |
| Evaluation results | Surface intrinsic resistance | Ω | >1E+16 | — | 2.3E+13 | 3.6E+10 | 2.3E+15 | 3.0E+15 | — |
|  | Dust adhesion |  | X | — | Δ | ○ | X | X | — |
|  | Surface property |  | ○ | X | X | Δ | Δ | Δ | Molding is impossible. |
|  | Resistance to adhesion to metal |  | X | ◎ | Δ | Δ | Δ | Δ |  |
|  | Resistance to drawdown |  | ○ | X | ○ | X | Δ | Δ |  |
|  | Deflection temperature under load | °C. | 95 | — | 94 | 93 | 94 | 95 |  |
|  | Low temperature falling weight impact strength | J | 41 | — | 42 | 13 | 42 | 41 |  |

Notes:
The component A-3 is the total of a-3-1~4 and a free AS contained in a-1 and a-2.
In Table, "empty space (blank)" indicates "0.0 (No presence)".
In Table, "—" indicates no presence of measured values since the measurement was not conducted.

(2) Evaluation Method

The measurement methods of the respective evaluation items for Examples and Comparative Examples will be described below.

(2-1) Surface Intrinsic Resistance

Each test piece was obtained by injection molding a disk having a diameter of 100 mm, a thickness of 2 mm and a gate in the center by an injection molding machine IS25EP (manufactured by Toshiba Machine Co., Ltd.). The molding conditions were a resin temperature of 250° C. and a mold temperature of 60° C. After each disk type test piece obtained in the above-mentioned method was left under conditions of a temperature at 23° C. and a humidity at 50% RH for 24 hours, the surface intrinsic resistance (Ω) was measured by a resistance meter (trade name: HIGH RESISTANCE METER (4339B: HIGH RESISTANCE METER+16008: RESISTIVITY CELL), manufactured by Agilent Technologies Japan, Ltd.) at applied voltage of 1000 V.

(2-2) Dust Adhesion

Using the resin compositions of Examples and Comparative Examples, a common ABS resin having no antistatic effect, and a static electricity-controlled ABS resin having antistatic effect, disk type test pieces having a diameter of 100 mm and a thickness of 2 mm, same as that used for the above-mentioned (2-1) surface intrinsic resistance evaluation were set in a manner that the disk faces of the test pieces were set vertically. After these test pieces were left in a room until the test piece of the common ABS resin was entirely covered with dust, the dust adhesion state to the disk face of respective test pieces was evaluated by visual observation by the following method.

On the basis of the dust adhesion states of the test pieces of the common ABS resin having no antistatic effect and the static electricity-controlled ABS resin having antistatic effect, the evaluation was carried out by relatively comparing the dust adhesion states of the test pieces of the resin compositions of Examples and Comparative Examples. The evaluation criteria are shown below.

○: Dust adhesion was almost the same as that of the test piece of the static electricity-controlled ABS resin;

Δ: Dust adhesion was about middle between that of the test piece of the static electricity-controlled ABS resin and that of the test piece of the common ABS resin; and ×: Dust adhesion was almost the same as that of the test piece of the common ABS resin.

Meanwhile, "ABS150" (manufactured by Techno Polymer Co., Ltd.) was used as the common ABS resin having no antistatic effect and "EXCELLOY EK 10" (manufactured by Techno Polymer Co., Ltd.) was used as the static electricity-controlled ABS resin, which is a sustainable antistatic and conductive material.

The evaluation results prove that the polished powder at the time of sanding and dust during storage hardly adheres as the evaluation results are close to those of the static electricity-controlled ABS resin, and thus these test pieces are judged excellent in dust adhesion property.

(2-3) Surface Property

Cylindrical blow molded articles with a diameter of 70 mm, a length of 400 mm, and a thickness of 3 mm were produced by blow molding by a blow molding machine DA-50 (manufactured by PLACO Co., Ltd.). The molding conditions were parison temperature of 240° C., injection speed (%) of 90, screw rotation speed of 30 rpm, blow pressure of 8 kg/cm$^2$ G (air), cooling time of 90 seconds, and mold temperature of 60° C.

Uneven recessed inferior parts (recesses with a size of 0.02 mm or larger) observed in the surface (excluding the top and bottom circular parts) of each cylindrical blow molded article obtained by the above-mentioned method were counted by visual observation and same measurement was carried out each for 5 molded articles and the average of the number of recesses was calculated. The evaluation was carried out based on the following criteria.

○: The number of the average recesses was less than 10,

Δ: The number of the average recesses was not less than 10 and less than 20, and ×: The number of the average recesses was not less than 20.

As the evaluation results, as the number of the average recesses is small, the surface property is excellent.

(2-4) Resistance to Adhesion to Metal

After 50 g of each thermoplastic resin composition for blow molding was charged into Labo-Plasto-Mill 4C150-10 (manufactured by Toyo Seiki Co., Ltd.) set at 240° C. and rotation speed of 30 rpm, it was kneaded for 10 minutes. Thereafter, the die block was disassembled from the Labo-Plasto-Mill and after a lapse of 3 minutes from completion of the kneading, the resin adhering to the metal surface in the die block inside was separated by a nipper. Thereafter, the surface area of the portion where the metal surface was exposed by separating the resin adhering to the die block inside was evaluated by visual observation.

The evaluation was carried out based on the following criteria.

⊙: 90% or more of resin adhering to the metal surface was peeled off;

○: Not less than 50% and less than 90% of resin adhering to the metal surface was peeled off;

Δ: Not less than 10% and less than 50% of resin adhering to the metal surface was peeled off; and ×: Less than 10% of resin adhering to the metal surface was peeled off.

As the evaluation results, as the ratio of the resin adhering to the metal surface was peeled more, the resin was less adhesive to the metal and thus excellent in the resistance to adhesion to a metal. As the resistance to adhesion to a metal is better, the adhesion of the resin to a metal is lower.

(2-5) Resistance to Drawdown

Using the blow molding machine DA-50, a parison was injected to a length of about 500 mm (parison weight: about 500 g) at 240° C. parison temperature and the time until the parison dropped and fell from a die was measured and the resistance to drawdown was evaluated according to the following criteria.

○: Time until the parison dropping after parison injection exceeded 60 seconds;

Δ: Time until the parison dropping after parison injection was 20 to 60 seconds; and ×: Time until the parison dropping after parison injection was less than 20 seconds.

As the evaluation results, as the time to keep the parison from dropping is longer, the resistance to drawdown is more excellent.

(2-6) Deflection Temperature Under Load

Each test piece with a width of 10 mm, a height of 4 mm, and a length of 80 mm was produced by an injection molding machine J100E (manufactured by The Japan Steel Works, Ltd.). The molding conditions were 250° C. of molding temperature and 60° C. of mold temperature. The evaluation was carried out by a Flat-wise method at a load of 1.82 MPa according to ISO75.

As the evaluation results, as the deflection temperature under load is higher, the heat resistance is higher.

(2-7) Low Temperature Falling Weight Impact Strength

After the cylindrical blow molded articles used in the evaluation of the above-mentioned (2-3) surface property were left at −30° C. in a prefabricated thermostat bath for 2 hours, a Du-Pont falling weight impact strength at −30° C. (weight of the weight×half breakage height) (J) was measured. As shown in FIGS. 1(a) and 1(b), each cylindrical blow molded article 1 was set on the tool 3 for fixing a molded article made of a metal in a manner that the parting line 2 was set horizontally and a weight was dropped to the center part of the cylindrical molded article.

As the evaluation results, as the falling weight impact strength (J) is higher, the low temperature falling weight impact is more excellent.

From the results of Examples 1 to 19 of Table 1 and Comparative Examples 1 to 7 of Table 2, the following are made clear.

Examples 1 to 19 containing 0.01 to 10 parts of the antistatic agent (B) with a melting point of 170° C. or lower to the styrene based resin (A) were excellent in dust adhesion property, surface property (appearance), resistance to adhesion to a metal, resistance to drawdown (moldability), deflection temperature under load (heat resistance), and low temperature falling weight impact strength (impact resistance).

Comparative Example 1 containing no antistatic agent (B) had high surface intrinsic resistance and was inferior in dust adhesion property and resistance to adhesion to a metal, as compared with Examples containing an antistatic agent (B).

Comparative Example 2 containing 15 parts of the antistatic agent (B) which is outside of the scope of the present invention was inferior in surface property and resistance to drawdown and was impossible to give a good blow molded article.

Comparative Example 3 containing no graft copolymer (A-1: a-1) was inferior in surface property, and Comparative Example 4 containing no graft copolymer (A-2: a-2) was inferior in resistance to drawdown and low temperature falling weight impact strength.

Comparative Examples 5 and 6 containing the antistatic agents (b-5) and (b-6) having a melting point exceeding 170° C. as the antistatic agent (B) had high surface intrinsic resistances and were inferior in dust adhesion property.

Comparative Example 7 using neither the graft copolymer (A-1: a-1) nor the graft copolymer (A-2: a-2) was inferior in blow moldability and was impossible to give a good blow molded article.

In comparison of Examples 1 to 13 and Examples 15 to 19 with the same compositions although the types and amounts of the antistatic agents were different, it was found that Examples 1 to 6 using the antistatic agent (b-1) with a melting point in a range of 80 to 170° C., the most preferable range, were excellent in the balance among the dust adhesion property, surface property, resistance to adhesion to a metal, resistance to drawdown, deflection temperature under load, and low temperature falling weight impact strength.

From results of Examples 1 to 6 containing antistatic agent (b-1) in changed amounts, it was found that Examples 2 to 4 containing the antistatic agent (b-1) in an amount within a more preferable range of 2 to 4 parts were excellent in the balance among the dust adhesion property, surface property, resistance to adhesion to a metal, resistance to drawdown, deflection temperature under load, and low temperature falling weight impact strength.

From results of Example 3 and Examples 16 to 19 in which the mixing ratios of the graft copolymer (A-1: a-1), the graft copolymer (A-2: a-2), and the copolymer (A-3: a-34 to a-3-4) were changed, it was found that Example 3 was excellent in the balance among the dust adhesion property, surface property, resistance to adhesion to a metal, resistance to drawdown, deflection temperature under load, and low temperature falling weight impact strength.

Examples 1 to 13 and Examples 15 to 19 containing components (C), (D) and (E) were more excellent in the balance among the dust adhesion property, surface property, and resistance to adhesion to a metal than Example 14 which did not contain them.

Further, Example 15 containing the copolymer (a-3-4) obtained by copolymerizing N-phenylmaleimide as the other copolymerizable components was excellent in deflection temperature under load.

Industrial Applicability

The thermoplastic resin composition for blow molding of the present invention is not only excellent in surface property of a blow molded article, impact resistance, heat resistance, and blow moldability such as resistance to drawdown, but also gives a molded article having the molded article surface to which polished powder generated in a sanding process before coating hardly adheres and also the molded article surface to which dust hardly adheres during storage until the coating process. Accordingly, the work for removing them before coating is lessened and productivity of the blow molded article can remarkably improved.

Further, addition of at least one compound (C) selected from the group consisting of hydroxides and carbonates of alkali metals, hydroxides, carbonates and oxides of alkaline earth metals, talc (D), and a polyolefin based wax (E) to the above-mentioned resin composition lowers the adhesion of the resin composition to a metal and the resin composition adhering to a die at the time of blow molding scarcely causes thermal deterioration and decomposition, and therefore, there is less possibility of damaging the surface appearance of the blow molded article. Further, since the resin composition hardly adheres to the metal surfaces of the screw surface and the barrel inner wall of a blow molding machine, the workability of replacing the resin becomes excellent and the productivity can be remarkably improved.

Moreover, fine irregularities are formed on the parison surface at the time of blow molding, gas purging between the parison surface and the mold surface occurs well, and furthermore, since formation of recesses larger than the fine irregularities can be suppressed, the work needed for the secondary processability such as sanding to obtain a smooth coating face can be made easy. Consequently, the present invention provides the remarkably advantageous thermoplastic resin composition for blow molding for obtaining a blow molded article such as an air spoiler or the like which is required to have good surface appearance, and the blow molded article obtained by molding the composition.

The invention claimed is:

1. A thermoplastic resin composition for blow molding comprises;
   100 parts by weight of a styrene based resin composition (A) containing 0.1 to 30% by weight of the following graft copolymer (A-1), 1 to 39% by weight of the following graft copolymer (A-2), and 45 to 95% by weight of the following copolymer (A-3), the total of the graft copolymer (A-1), the graft copolymer (A-2), and the copolymer (A-3) being 100% by weight, and
   0.1 to 10 parts by weight of an antistatic agent (B) with a melting point of 170° C. or lower:
   (A-1): a graft copolymer having a graft ratio of from 30 to 120% obtained by polymerizing 95 to 5 parts by weight of a monomer mixture containing 0.1 to 30.2% by weight of an α, β-unsaturated glycidyl ester compound, 9.9 to 40% by weight of a vinyl cyanide compound, and 59.9 to 90% by weight of an aromatic vinyl compound, the total of the monomers being 100% by weight, in the presence of 5 to 95 parts by weight of a conjugated diene based rubber type polymer, selected from the group consisting of polybutadienes, butadiene-styrene copolymers and butadiene-acrylonitrile copolymers, wherein the total of the conjugated diene based rubber type polymer and the monomer mixture is 100 parts by weight;

(A-2): a graft copolymer having a graft ratio of from 30 to 120% obtained by polymerizing 95 to 5 parts by weight of a monomer mixture containing 10 to 40% by weight of a vinyl cyanide compound and 60 to 90% by weight of an aromatic vinyl compound, the total of the monomers being 100% by weight, in the presence of 5 to 95 parts by weight of a conjugated diene based rubber type polymer selected from the group consisting of polybutadienes, butadiene-styrene copolymers and butadiene-acrylonitrile copolymers, wherein the total of the conjugated diene based rubber type polymer and the monomer mixture is 100 parts by weight, and (A-3): a copolymer obtained by polymerizing a monomer mixture containing 5 to 40% by weight of a vinyl cyanide compound, 45 to 95% by weight of an aromatic vinyl compound, and 0 to 50% by weight of other vinyl compounds copolymerizable with these monomers, the total of the monomers being 100% by weight.

2. The thermoplastic resin composition for blow molding of claim 1, wherein a melting point of the antistatic agent (B) is 40 to 170° C.

3. The thermoplastic resin composition for blow molding of claim 2, wherein 0.01 to 10 parts by weight of at least one compound (C) selected from the group consisting of hydroxides and carbonates of alkali metals, hydroxides, carbonates, and oxides of alkaline earth metals, 0.01 to 5 parts by weight of talc (D), and 0.01 to 5 parts by weight of a polyolefin based wax (E) are further blended with 100 parts by weight of the styrene based resin composition (A).

4. A blow molded article obtained by blow molding the thermoplastic resin composition for blow molding as described in claim 3.

5. The thermoplastic resin composition for blow molding of claim 1, wherein 0.01 to 10 parts by weight of at least one compound (C) selected from the group consisting of hydroxides and carbonates of alkali metals, hydroxides, carbonates, and oxides of alkaline earth metals, 0.01 to 5 parts by weight of talc (D), and 0.01 to 5 parts by weight of a polyolefin based wax (E) are further blended with 100 parts by weight of the styrene based resin composition (A).

6. A blow molded article obtained by blow molding the thermoplastic resin composition for blow molding as described in claim 5.

7. A blow molded article obtained by blow molding the thermoplastic resin composition for blow molding as described in claim 1.

8. A blow molded article obtained by blow molding the thermoplastic resin composition for blow molding as described in claim 2.

* * * * *